United States Patent
Zschocke et al.

[15] 3,696,115
[45] Oct. 3, 1972

[54] SUBSTITUTED 1,2,4-OXADIAZOLIDINE-3,5-DIONE

[72] Inventors: Albrecht Zschocke, 5 Berliner Strasse, 6702 Bad Duerkheim; Bernd Zeeh, 3 Thorwaldsenstrasse, 6700 Ludwigshafen; Adolf Fischer, 43 Speyerer Strasse, 6704 Mutterstadt, all of Germany

[22] Filed: Oct. 7, 1970

[21] Appl. No.: 78,974

[30] Foreign Application Priority Data

Oct. 15, 1969 Germany..........P 19 51 880.0

[52] U.S. Cl. ..................260/307 B, 71/92
[51] Int. Cl. ...........................C07d 85/52

[58] Field of Search.................260/307 B

[56] References Cited

FOREIGN PATENTS OR APPLICATIONS 1,560,971  3/1969  France

*Primary Examiner*—Alex Mazel
*Assistant Examiner*—R. V. Rush
*Attorney*—Johnston, Root, O'Keeffe, Keil, Thompson & Shurtleff

[57] ABSTRACT

2-(3-tert-butylcarbamoyloxyphenyl)-4-methyl-1,2,4-oxadiazolidine-3,5-dione which has a good herbicidal action and a process for controlling the growth of unwanted plants with this compound.

1 Claim, No Drawings

SUBSTITUTED 1,2,4-OXADIAZOLIDINE-3,5-DIONE

It is known to use 2-(3-dimethylcarbamoyloxyphenyl)-4-methyl-1,2,4-oxadiazolidine-3,5-dione as a herbicide (Belgian Pat. No. 714,355; French Pat. No. 1,560,971); however, its action is not satisfactory because unwanted plants are not injured to a sufficient extent.

We have now found that 2-(3-tert-butylcarbamoyloxyphenyl)-4-methyl-1,2,4-oxadiazolidine-3,5-dione of the formula

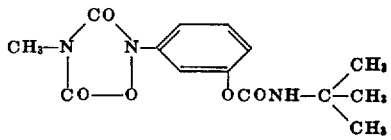

has a good herbicidal action.

The production of the compound of the invention is described below; parts in the examples are by weight.

EXAMPLE 1

41.7 parts of 3-nitrophenol and 6.5 parts of ammonium chloride are suspended or dissolved in 75 parts of water and 150 parts of ethanol; at a temperature of 70° to 80° C and in a nitrogen atmosphere, 52 parts of zinc dust is introduced in portions into the suspension while stirring well. The mixture is then filtered and the residue washed with 150 parts of alcohol. At a temperature of 20° to 30° C, in a nitrogen atmosphere and while stirring well, 45.5 parts of methyl N-methyl-N-chloroformylcarbamate is added to the filtrate. The precipitate is suction filtered, washed with diluted alcohol and dried. 52 parts of 2-(3-hydroxyphenyl)-4-methyl-1,2,4-oxadiazolidine-3,5-dione having a melting point of 175° C is obtained.

EXAMPLE 2

20.8 parts of 2-(3-hydroxyphenyl)-4-methyl-1,2,4-oxadiazolidine-3,5-dione is suspended in 50 parts of dioxane to which 3 drops of triethylamine have been added; 99 parts of tert-butyl isocyanate is introduced into the suspension. The mixture is kept for 2 hours at 90° C and then cooled; the solvent is removed in vacuo and the residue recrystallized from isopropanol. 22 parts of 2-(3-tert-butylcarbamoyloxyphenyl)-4-methyl-1,2,4-oxadiazolidine-3,5-dione having a melting point of 131° C is obtained.

The herbicides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C, e.g. tetrahydronaphthalene or alkylated napthalenes, or organic liquids having boiling points higher than 150° C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

It is also possible to add insecticides, fungicides, bactericides and other herbicides to the herbicides according to the invention, or to mix them with fertilizers. The application of the compound of the invention is illustrated by the following example.

EXAMPLE 3

Outdoors, the plants Zea mays, Triticum vulgare, Sinapis arvensis, Galium aparine, Poa annua, Alopecurus myosuroides, Echinochloa crusgalli and Setaria glauca are treated at a growth height of 3 to 18 cm with 1 kg per hectare of each of the following active ingredients, each amount being dispersed in 500 liters of water per hectare:

I. 2-(3-tert-butylcarbamoyloxyphenyl)-4-methyl-1,2,4-oxadiazolidine-3,5-dione;
II. 2-(3-isopropylcarbamoyloxyphenyl)-4-methyl-1,2,4-oxadiazolidine-3,5-dione;
III. 2-(3-dimethylcarbamoyloxyphenyl)-4-methyl-1,2,4-oxadiazolidine-3,5-dione.

After 2 to 3 weeks it is ascertained that compound I has a stronger herbicidal action than compounds II and III. The results of the experiment are given in the following table:

| | Active ingredient | | |
|---|---|---|---|
| | I | II | III |
| Crop Plants: | | | |
| Zea mays | 5 | 5 | 5 |
| Triticum vulgare | 5 | 5 | 0 |
| Unwanted plants: | | | |
| Sinapis arvensis | 100 | 95 | 80 |
| Galium aparine | 95 | 80 | 45 |
| Poa annua | 95 | 85 | 70 |
| Alopecurus myosuroides | 95 | 90 | 65 |
| Echinochloa crus-galli | 100 | 80 | 60 |
| Setaria glauca | 95 | 80 | 55 |

0 = no damage
100 = complete destruction

EXAMPLE 4

70 parts by weight of compound I is mixed with 30 parts by weight of N-methyl-α-pyrrolidone. A mixture is obtained which is suitable for application in the form of very fine drops.

EXAMPLE 5

20 parts by weight of compound I is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 6

20 parts by weight of compound I is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of compound I is dissolved in a mixture consisting of 25 parts by weight of cyclohexanol, 65 parts by weight of a mineral oil fraction having a boiling point between 210° and 280° C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound I is well mixed with 3 parts by weight of the sodium salt of diisobutyl-naphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 9

3 parts by weight of compound I is intimately mixed with 97 parts by weight of particulate kaolin. A dust is obtained containing 3 percent by weight of the active ingredient.

EXAMPLE 10

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. 2-(3-tert-butylcarbamoyloxyphenyl)-4-methyl-1,2,4-oxadiazolidine-3,5-dione of the formula

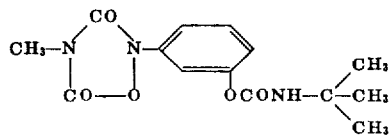

* * * * *

PO-1050
(5/69)

UNITED STATES PATENT OFFICE
CERTIFICATE OF CORRECTION

Patent No. 3,696,115                    Dated October 3, 1972

Inventor(s) Zschocke et al

It is certified that error appears in the above-identified patent and that said Letters Patent are hereby corrected as shown below:

Cover page, left hand column, insert
-- [73] ASSIGNEE: Badische Anilin -& Soda- Fabrik Aktiengesellschaft, Ludwigshafen am Rhein, Germany --

Signed and sealed this 17th day of April 1973.

(SEAL)
Attest:

EDWARD M. FLETCHER, JR.                ROBERT GOTTSCHALK
Attesting Officer                      Commissioner of Patents